Figure 1:
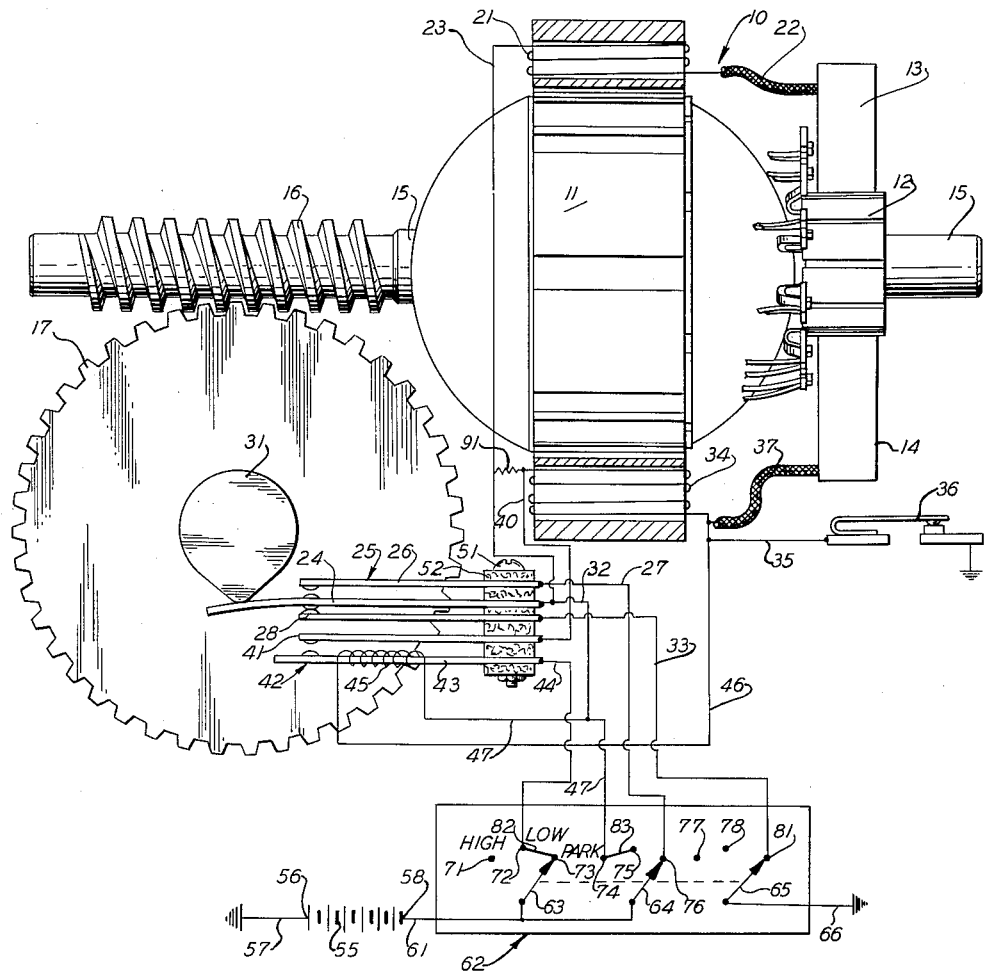

Dec. 26, 1961     T. W. DAYKIN     3,015,056
WINDSHIELD WIPER

Filed June 23, 1960     2 Sheets-Sheet 1

THEODORE W. DAYKIN
INVENTOR.

BY John R. Faulkner
Keith L. Zerschling

ATTORNEYS

Dec. 26, 1961    T. W. DAYKIN    3,015,056
WINDSHIELD WIPER
Filed June 23, 1960    2 Sheets-Sheet 2

THEODORE W. DAYKIN
INVENTOR.
BY John C. Faulkner
Keith L. Zerschling
ATTORNEYS 3,015,056
WINDSHIELD WIPER
Theodore W. Daykin, Dearborn, Mich., assignor to Ford Motor Company, Dearborn, Mich., a corporation of Delaware
Filed June 23, 1960, Ser. No. 38,302
6 Claims. (Cl. 318—468)

This invention relates to an electrical circuit for a windshield wiper and more particularly to an electrical circuit for a windshield wiper that provides dynamic braking for the armature of an electric motor employed to drive the windshield wiper.

According to one embodiment of the invention, a control switch having three positions corresponding to high speed operation, low speed operation, and park position for a windshield wiper motor is connected to a source of electrical energy. When the control switch is positioned to call for low speed operation of the winshield wiper motor, the shunt field winding of the motor is energized through the control switch and closed time delay or thermostatic switch, and the series field winding of the motor is energized directly from the source of electrical energy means of the control switch.

The thermostatic switch has a heater element connected to be energized through the control switch when the control switch is positioned in either the high or low positions and this heater element heats a bimetal blade to close the switch.

When the control switch is moved to the high position, the series field winding remains energized while the shunt field winding is disconnected from the source of electrical energy. The removal of the flux supplied by the shunt field permits an increase in motor speed over the speed obtained when the control switch is positioned in the low position.

The present invention is also provided with a parking switch of the single pole double throw type that is actuated once during every revolution of the windshield wiper motor. During low or high speed operation this action has no affect upon the operation of the windshield wiper motor since neither the shunt field winding, the series field winding, nor the armature are energized through the parking switch.

When the control switch is thrown to the park position, however, the series field winding is energized through the parking switch, while the shunt field remains energized through the thermostatic switch. When the wiper motor reaches a certain position in its cycle, preferable when the windshield wipers are positioned near their parking position, the parking switch is actuated and this deenergizes the series field and short circuits the series field and armature. The heater element for the bimetal switch is deenergized at the same time by the action of the parking switch. The thermostatic switch will remain closed for a short period of time, however, until the heater element and the blade of the switch cool sufficiently to permit the opening of the switch contacts. When the contacts of the thermostatic switch open, the windshield wiper motor is completely deenergized.

Dynamic braking of the windshield wiper motor is accomplished from the time the parking switch is actuated until the thermostatic switch opens, since during this interval the shunt field is energized and the armature and series field are short circuited. This dynamic braking of the windshield wiper motor permits the blades of the windshield wiper to be parked at the same position on the windshield under all conditions of load and temperature.

An object of the invention is the provision of a circuit for an electric windshield wiper in which the blades of the windshield wipers may be parked at the same position on an automotive vehicle windshield under all conditions of temperature and load.

Another object of the invention is the provision of dynamic braking for an electrical motor that may conveniently be employed with a windshield wiper.

A further object of the invention is the provision of dynamic braking for an electrical motor of a windshield wiper in which the shunt field of the motor is energized for a period of time while the armature is short circuited.

Figure 3:
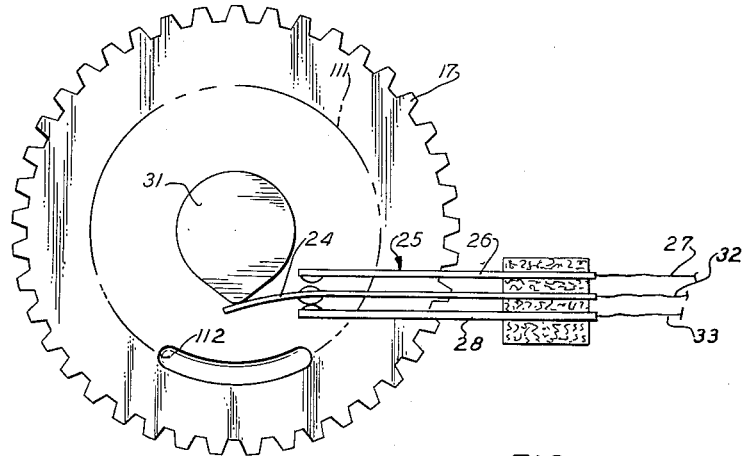
Figure 2:
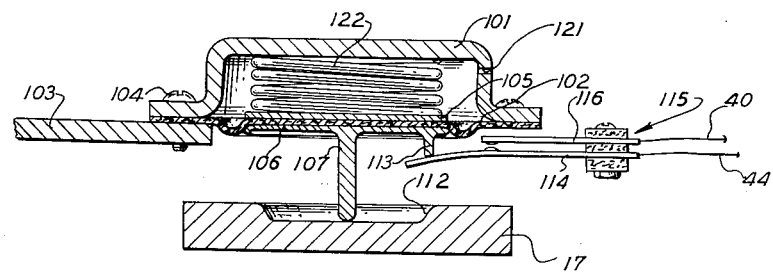

Other objects and attendant advantages of the invention will become more readily apparent when the specification is considered in connection with the accompanying drawings in which:

FIG. 1 is a schematic view of the invention;
FIG. 2 is a sectional view showing an alternate switching mechanism which may be employed in the schematic of FIG. 1, and
FIG. 3 is a view of an alternate form of gear for actuating the switch shown in FIG. 2.

Referring now to the drawings in which like reference numerals designate like parts throughout the several views thereof, there is shown in FIG. 1 a schematic view of one embodiment of the invention in which an electric motor, generally designated by the numeral 10, includes an armature 11 rotatably mounted in a frame (not shown). The armature 11 has a commutator 12 positioned in contact with brushes 13 and 14 and has a shaft 15 including a worm 16. The worm 16 engages a gear 17 that is connected to the blades of a windshield wiper through a suitable linkage mechanism. The windshield mechanism, blades and linkage have not been shown, however, any conventional mechanism may be employed, such as that shown in the patent to Coxon et al., No. 2,364,603.

The electric motor 10 includes a series field winding 21 connected at one end to the brush 13 through a lead 22, and connected at the other end through a lead 23 to a flexible blade 24 of a double throw single pole switch, generally designated by the numeral 25. The double throw single pole switch 25 also includes a first stationary terminal 26 connected to a lead 27, and a second stationary terminal 28. The flexible blade 24 is normally biased, by means not shown, into engagement with the terminal 26. The gear 17 includes a cam 31 for moving the blade element 24 out engagement with the terminal 26 and into engagement with the terminal 28 once during every revolution of the gear. The blade element 24 is also connected to a lead 32, and the terminal 28 is connected to a lead 33.

The electric motor 10 also includes a shunt field winding 34 connected to ground at one end through lead 35 and circuit breaker 36. The brush 14 is also connected to ground through lead 35 and circuit breaker 36 by means of a lead 37. The other end of the shunt winding 34 is connected through a lead 40 to a stationary terminal 41 of a thermostatic switch 42 having a bimetal flexible blade 43. The bimetal blade 43 is connected to a lead 44. A heater element or winding, designated by the numeral 45, is positioned around the bimetal blade 43, and is connected to ground at one end through a lead 46, the lead 36 and circuit breaker 36. The other end of the heater element 45 is connected to a lead 47.

The double throw single pole switch 25 and the thermostatic switch 42 may be supported by means of a nut and bolt assembly 51 and by insulating spacers 52 positioned between the terminals of these switches.

The electric motor is energized from a suitable source of electrical energy, such as an automotive vehicle storage battery 55 having one terminal, for example, positive terminal 56, connected to ground through lead 57, and having the other terminal, for example, negative terminal 58, connected through lead 61 to a control switch, generally designated by the numeral 62. The control switch 62 may be a ganged switch having three control arms, designated by the numerals 63, 64 and 65. The pivotal end of each of the control arms 63 and 64 is connected to the terminal 58 of the battery 55 through the lead 61, while the pivotal end of control arm 65 is connected to ground through a lead 66. The control arms may be positioned in any of three locations or positions corresponding to high speed operation of the motor 10, low speed operation of the motor 10, and park position of the motor and electrical windshield wiper apparatus driven by the motor. Each of these control arms has three electrical contacts associated therewith for engagement with the movable end of the arms. The arm 63 has contacts 71, 72 and 73, the arm 64 has contacts 74, 75 and 76, and the movable arm 65 has contacts 77, 78 and 81.

It can be appreciated that when the control switch is positioned in the high position, the control arms 63, 64 and 65, are in contact with contacts 71, 74 and 77 respectively. When the control switch is moved to the low position the control arms 63, 64 and 65 are in contact with contacts 72, 75 and 78 respectively, and as shown in the drawing, when the control switch is moved to the park position the control arms 63, 64 and 65 are positioned in contact with contacts 73, 76 and 81 respectively. The contacts 72 and 73 of control arm 63 are connected through a lead 82, and the contacts 74 and 75 of control arm 64 are connected through a lead 83.

The contact 72 of control arm 63 is connected to the bimetal blade element 43 of thermostatic switch 42 through the lead 44, and contact 73 is similarly connected thereto through lead 82 and contact 72. The contact 74 and the contact 75 of control arm 64 are connected to one end of the heater element 45 of thermostatic switch 42 through the lead 47, and to the movable blade 24 of the double throw single pole switch 25 through lead 47 and lead 32. The contact 76 of control arm 64 is connected to the stationary terminal 26 of the single pole double throw switch 25 through the lead 27. The contact 81 of control arm 65 is connected to the other stationary terminal 28 of the single pole double throw switch 25 through the lead 33.

As shown in FIG. 1, the control switch 62 is positioned in the park position, and the electric motor 10 is completely deenergized. When the control switch 62 is thrown to the high position so that control arms 63, 64 and 65 are positioned against contacts 71, 74 and 77 respectively, the heater element 45 of the thermostatic switch 42 is energized from the battery 55 through lead 61, control arm 64, contact 74 and lead 47. The heater element 45 acts on the bimetal blade 43 so that it moves into contact with the terminal 41 thereby closing the thermostatic switch. As will be explained subsequently, the shunt field winding 34 is adapted to be energized through this closed thermostatic switch by means of control arm 63, however, when control arm 63 is positioned in the high position it is in contact with contact 71 and hence is not connected to the thermostatic switch. The series field winding 21 is energized from battery 55 through lead 61, control arm 64, contact 74, lead 47, lead 32 and lead 23. Thus, with the control switch positioned in the high position, the series field winding 21 is energized but the shunt field winding 34 is not energized. A shunt resistor 91 may be connected, however, between the lead 23 and the shunt field winding 34 to partially energize the shunt field winding when the control switch is positioned in the high position.

If low speed operation of the windshield wiper motor and the associated mechanism is desired, the control switch is moved to the low position so that control arms 63, 64 and 65 are positioned against contacts 72, 75 and 78 respectively. It can be appreciated that the heater winding 45 and the series field winding 21 are energized exactly as they were when the control switch was positioned in the high position since contacts 74 and 75 are connected through a lead 83. The shunt field winding 34 is now energized from the battery 55 through lead 61, control arm 63, contact 72, lead 44, bimetal blade element 43, stationary terminal 41 and lead 40. The thermostatic switch 42 is closed when the control switch is positioned in either the high or the low position since the heater element 45 is energized when the control switch is located in either of these positions. Thus, during low speed operation both the shunt field winding 34 and the series field winding 21 are energized. During both high speed and low speed operation, the single pole double throw switch 25 is actuated by cam 31 once during every revolution of the gear 17, however, this has no effect upon the motor 10 or other parts of the circuit since neither the shunt field winding nor the series field winding is energized through this switch during high speed or low speed operation.

When it is desired to shut off or park the windshield wiper apparatus associated with the motor 10, the control switch 62 is thrown to the park position so that control arms 63, 64 and 65 are positioned against contacts 73, 76 and 81 respectively, as shown in FIG. 1. In this position the shunt field winding 34 is energized as it was during low speed operation as long as the thermostatic switch 42 remains closed. As explained previously, the heater winding 45 was energized from the battery 55 through control arm 64 and contacts 74 or 75 during high speed or low speed operation, however, with control arm 64 positioned against contact 76, the heater winding is no longer energized through this circuit but is energized through the double throw single pole switch as will be explained subsequently. With control arm 64 in contact with contact 76, the series field winding 21 is energized from the battery 55 through lead 61, control arm 64, contact 76, lead 27, terminal 26 and movable blade element 24 of the single pole double throw switch 25, and then through lead 23 which is connected to the movable blade 24. As explained previously, the movable blade element 24 will be in contact with the terminal 26 throughout the revolution of the gear 17 except at that specific point when the cam 31 moves the blade element out of contact with the terminal 26. The control arm 65 is connected to ground through the lead 66, and is connected to the terminal 28 of the double throw single pole switch 25 through contact 81 and lead 33.

Thus, when the control switch is thrown to the park position, the series field winding will be energized through the double throw single pole switch 25 and the shunt field winding 34 will be energized through the thermostatic switch 42. It can be appreciated that the heater element or winding 45 will remain energized as long as the movable blade 24 of the single pole double throw switch 25 is in contact with the terminal 26 since the lead 47 is connected to the lead 32 and the lead 32 is energized through the blade element 24, terminal 26, lead 27, contact 76, control arm 64 and lead 61.

When the electric motor 10 has rotated the gear 17 and the cam 31 into the position shown in FIG. 1, so that the blades of the windshield wiper assembly driven by the motor are positioned near their park position, the cam 31 moves the flexible blade 24 of the switch 25 out of contact with the terminal 26 and into contact with the terminal 28. This movement of the blade deenergizes the series field winding 23 and the heater element 45 of the thermostatic switch 42 since contact has been broken with the energized lead 27. With the flexible blade element 24 in contact with the teminal 28, the series field winding 21 and the armature 11 of the motor 10 are short circuited. One end of the armature winding is connected to ground through brush 14, lead 37, lead 35 and circuit breaker 36, while the end of the series field winding not connected to the armature is connected to ground through lead 23, flexible blade element 24, terminal 28, lead 33, contact 81, control arm 65 and lead 66.

Thus, the armature and the series field winding 21 are short circuited simultaneously with the deenergization of the heater winding 45 of thermostatic switch 42, however, the shunt field winding will remain energized for a short period of time thereafter—until the heater winding 45 and the bimetal blade 43 cool sufficiently to permit the bimetal blade 43 to move out of contact with the terminal 41.

Thus, effective dynamic braking of the motor 10 is accomplished since the series field winding and the armature are short circuited during a short time interval while the shunt field winding remains energized.

FIGS. 2 and 3 show another embodiment of the invention in which a dash pot operated switch is employed as the time delay switch rather than the thermostatic switch 42 shown in FIG. 1. In all other respects, these two embodiments of the device are similar and operate in the same manner. The dash pot includes a casing 101 that has affixed to the front face thereof a flexible diaphragm 102, and which may be suitably affixed to a support element 103 by means of a plurality of screws, one of which is shown at 104. The dash pot includes a pair of plates 105 and 106 positioned on either side of the flexible diaphragm 102. The plate 106 includes a push rod 107 which tracks upon the gear 17 as shown by the dashed circular lines 111. The gear includes a groove 112 in a portion of the track 111 so that once during every revolution of the gear 17 the push rod 107 has an opportunity to drop into this groove. The plate 106 also includes a pin 113 which is capable of moving flexible blade element 114 of switch 115 out of contact with terminal 116.

The dash pot housing 101 includes an orifice 121 which permits air to flow into and out of the casing 101 in response to movement of the rod 107 and the flexible diaphragm 102. A spring 122 is positioned within the housing 101 in engagement with the housing and the plate 105 for urging the flexible diaphragm 102 and plate 106 toward the gear 17. When the wiper motor is energized, the gear 17 will be rotated and the rod 107 will move upwardly out of groove 112 to permit the switch 115 to close in a similar manner to the closing of thermostatic switch 42, when the heater winding 45 is energized. This forces a portion of the air contained in casing 101 out through the orifice 121 and the time constant of the switch is arranged in relation to the speed of rotation of the gear 17 so that during either high speed or low speed operation of the windshield wiper motor the rate of inflow of air through the orifice is insufficient to permit the spring 122 to move the flexible diaphragm far enough to open the switch 115.

The switch 115 will be opened by the pin 113 only when the cam 31 is positioned in the position shown in FIGS. 2 and 3, and only when the control switch shown in FIG. 1 is positioned in the park position. In this position the cam 31 has actuated the double throw single pole switch 25 so that the flexible blade element 24 is moved into contact with terminal 28 thereby short circuiting the armature and series field winding. At this time the spring 122 may force the push rod 107 into the groove 112 thereby opening the switch 115 and deenergizing the shunt field winding 34. This occurs at a given time interval after the cam 31 has moved the flexible blade element 24 of double throw single pole switch 25 out of contact with terminal 26 and into contact with terminal 28 since the orifice 121 will permit air to enter the housing 101 at a controlled rate and the spring rate of spring 122 is low enough to permit only a slow controlled movement of the flexible diaphragm against the difference in air pressure between the outside and inside of the housing.

The present invention thus provides a circuit for an electric windshiled wiper in which the blades of the windshield wiper apparatus may be parked in the same position under all conditions of temperature and load, and further provides dynamic braking of an electrical motor for this windshield wiper assembly in which the shunt field of the motor is energized for a given time interval while the armature of the motor is short circuited.

It will be understood that the invention is not to be limited to the exact construction shown and described but that various changes and modifications may be made without departing from the spirit and scope of the invention as defined in the appended claims.

I claim:

1. In an electrical system for an electric windshield wiper, the combination comprising, an electric motor having a series field winding, an armature and a shunt field winding, said armature being connected to said series field winding, a double throw single pole switch, means coupled to said armature for actuating said double throw single pole switch once during each operating cycle, a time delay switch, a control switch including a park position, a source of electrical energy, said series field winding being energized from said source of electrical energy through said control switch and said double throw single pole switch and said shunt field winding being energized through said control switch and said time delay switch when said control switch is positioned in said park position and prior to the time said double throw single pole switch is actuated, said armature and series field winding being short circuited through said double throw single pole switch when said double throw single pole switch is actuated, said time delay switch being constructed and arranged to open a given time interval after said series field winding and said armature have been short circuited.

2. In an electrical system for an electric windshield wiper, the combination comprising, an electric motor having a series field winding, an armature, and a shunt field winding, said armature being connected to said series field winding, a double throw single pole switch, means coupled to said armature for actuating said double throw single pole switch once during each operating cycle, a thermostatic switch including a heater winding, a control switch including a park position, a source of electrical energy, said series field winding and said heater winding being energized from said source of electrical energy through said control switch and said double throw single pole switch and said shunt winding being energized through said control switch and said thermostatic switch when said control switch is positioned in said park position and prior to the time said double throw single pole switch is actuated, said series field winding and said armature being short circuited and said heater winding being deenergized when said double throw single pole switch is actuated, said thermostatic switch being constructed and arranged to open a given time interval after said heater winding has been deenergized.

3. In an electrical system for an electric windshield wiper, the combination comprising, an electric motor having a series field winding, an armature, and a shunt field winding, said armature being connected to said series field winding, a double throw single pole switch, means coupled to said armature for actuating said double throw single pole switch once during each operating cycle, a dash pot operated switch, a control switch including a park position, a source of electrical energy, said series field winding and said armature being energized from said source of electrical energy through said control switch and said double throw single pole switch and said shunt field winding being energized through said dash pot operated switch when said control switch is positioned in park position and prior to the time said double throw single pole switch is actuated, said series field winding and said armature being short circuited when said double throw single pole switch is actuated, said dash pot switch being constructed and arranged to open a given time interval after said double throw single pole switch is actuated.

4. In an electrical circuit for a windshield wiper, the combination comprising, an electric motor including an armature, a series field winding, and a shunt field winding, a control switch including high, low and park positions, a source of electrical energy, a time delay switch, said time delay switch normally being closed when said electric motor is energized, said series winding and said armature being energized from said source of electrical energy through said control switch when said control switch is positioned in the high position, said series field winding and said armature being energized from said source and said shunt field winding being energized from said source through said time delay switch when said control switch is positioned in the low position, a double throw single pole switch, means coupled to said armature for actuating said double throw single pole switch once during each operating cycle, said series field winding being energized from said source of electrical energy through said control switch and said double throw single pole switch and said shunt winding being energized through said time delay switch when said control switch is positioned in said park position and prior to the time said double throw single pole switch is actuated, said series field winding and said armature being short circuited through said double throw single pole switch when said double throw single pole switch is actuated, said time delay switch being constructed and arranged to open a given time interval after said double throw single pole switch has been actuated.

5. In an electrical circuit for a windshield wiper, the combination comprising, an electric motor including an armature, a series field winding, and a shunt field winding, a control switch including high, low and park positions, a source of electrical energy, a thermostatic switch including a heater winding, said thermostatic switch being closed when said heater winding is energized, said series winding and said heater winding being energized from said source of electrical energy through said control switch when said control switch is positioned in the high position, said series field winding and said heater winding being energized from said source through said control switch and said shunt field winding being energized from said source through said control switch and through said thermostatic switch when said control switch is positioned in the low position, a double throw single pole switch, means coupled to said armature for actuating said double throw single pole switch once during each operating cycle, said series field winding and said heater winding being energized from said source of electrical energy through said control switch and said double throw single pole switch and said shunt winding being energized through said control switch and said thermostatic switch when said control switch is positioned in said park position and prior to the time said double throw single pole switch is actuated, said series field winding and said armature being short circuited through said double throw single pole switch and said heater winding being deenergized when said double throw single pole switch is actuated, said thermostatic switch being constructed and arranged to open a given time interval after said heater winding has been deenergized.

6. In an electrical circuit for a windshield wiper, the combination comprising, an electric motor including an armature, a series field winding, and a shunt field winding, a control switch including high, low and park positions, a source of electrical energy, dash pot operated switch, said dash pot operated switch normally being closed when said electric motor is energized, said series winding being energized from said source of electrical energy through said control switch when said control switch is positioned in the high position, said series field winding being energized from said source through said control switch and said shunt field winding being energized from said source through said control switch and through said dash pot operated switch when said control switch is positioned in the low position, a double throw single pole switch, means coupled to said armature for actuating said double throw single pole switch once during each operating cycle, said series field winding being energized from said source of electrical energy through said control switch and said double throw single pole switch and said shunt winding being energized through said control switch and said dash pot operated switch when said control switch is positioned in said park position and prior to the time said double throw single pole switch is actuated, said series field winding and said armature being short circuited through said double throw single pole switch when said double throw single pole switch is actuated, said dash pot operated switch being constructed and arranged to open a given time interval after said double throw single pole switch has been actuated.

No references cited.